US008919366B2

(12) United States Patent
Dunn

(10) Patent No.: US 8,919,366 B2
(45) Date of Patent: Dec. 30, 2014

(54) ELECTROMECHANICAL APPARATUS SYSTEM AND METHODS FOR DISPENSING OR PURGING FLUIDS

(71) Applicant: Martin Dunn, Duncan (CA)

(72) Inventor: Martin Dunn, Duncan (CA)

( * ) Notice: Subject to any disclaimer, the term of this patent is extended or adjusted under 35 U.S.C. 154(b) by 0 days.

(21) Appl. No.: 13/840,231

(22) Filed: Mar. 15, 2013

(65) Prior Publication Data

US 2014/0261734 A1 Sep. 18, 2014

(51) Int. Cl.
*B08B 3/00* (2006.01)
*B08B 9/032* (2006.01)
*F16K 51/00* (2006.01)

(52) U.S. Cl.
USPC ........... 137/15.04; 137/240; 239/10; 239/310

(58) Field of Classification Search
USPC ............... 137/238, 240, 1, 236.1, 209, 15.04; 239/1, 8, 310, 10
See application file for complete search history.

(56) References Cited

U.S. PATENT DOCUMENTS 1,864,947 A 6/1932 Selfridge
2,616,441 A 11/1952 Roberts
3,275,030 A 9/1966 Alvin
3,367,353 A 2/1968 Hunter
3,669,357 A 6/1972 Overbey
3,952,522 A 4/1976 Shettel
4,022,244 A 5/1977 Oman
4,096,877 A 6/1978 Arledge, II
4,280,478 A 7/1981 Duval et al.
4,355,652 A * 10/1982 Perkins ......................... 137/240
4,456,176 A * 6/1984 Agius .......................... 239/310
4,635,668 A 1/1987 Netter
4,784,173 A 11/1988 Carney
4,917,304 A 4/1990 Mazzei et al.
4,921,001 A 5/1990 Pittsinger
5,090,440 A * 2/1992 Ladouceur et al. ........... 137/209
5,193,578 A 3/1993 Noriyuki
5,193,744 A 3/1993 Goldstein
5,220,937 A 6/1993 Roberts et al.
5,303,729 A 4/1994 DeMarco
5,366,159 A 11/1994 Childers
5,413,134 A 5/1995 Burgess et al.
5,488,968 A 2/1996 Price et al.
5,584,665 A 12/1996 Walsh et al.
5,598,867 A 2/1997 Sullivan
5,694,963 A 12/1997 Fredell et al.
5,699,827 A 12/1997 Delorme et al.
5,775,593 A 7/1998 Delorme et al.
5,803,111 A 9/1998 Soszka
5,826,792 A 10/1998 Hasslinger
6,019,117 A 2/2000 Detsch et al.
6,173,732 B1 1/2001 Davis et al.
6,314,979 B1 11/2001 Lips
6,533,193 B2 3/2003 White
6,648,243 B1 11/2003 Kastner (Continued)

*Primary Examiner* — Kevin Lee
(74) *Attorney, Agent, or Firm* — Schmeiser, Olsen & Watts LLP

(57) ABSTRACT

An improved electromechanical apparatus for injecting or purging fluids on demand is disclosed. Also disclosed are systems and methods for using the apparatus, including automatic fertilizer injection/injecting and water line purging systems for use in lawn maintenance. The apparatus can be located in a main water line before the distribution valves of an irrigation system, for example, where it can be activated or deactivated without interfering with the normal usage of the system.

24 Claims, 3 Drawing Sheets

(56) References Cited

U.S. PATENT DOCUMENTS

| | | | |
|---|---|---|---|
| 6,748,884 | B1 | 6/2004 | Bettin et al. |
| 6,763,845 | B2 | 7/2004 | Hoggard |
| 6,942,128 | B1 | 9/2005 | Walter |
| 7,383,145 | B2 | 6/2008 | Tabaian et al. |
| 2002/0139866 | A1 | 10/2002 | White |
| 2002/0145057 | A1 | 10/2002 | Leedy et al. |
| 2003/0052192 | A1 | 3/2003 | Kerr |
| 2004/0217190 | A1 | 11/2004 | Silva |

* cited by examiner

FIG. 1
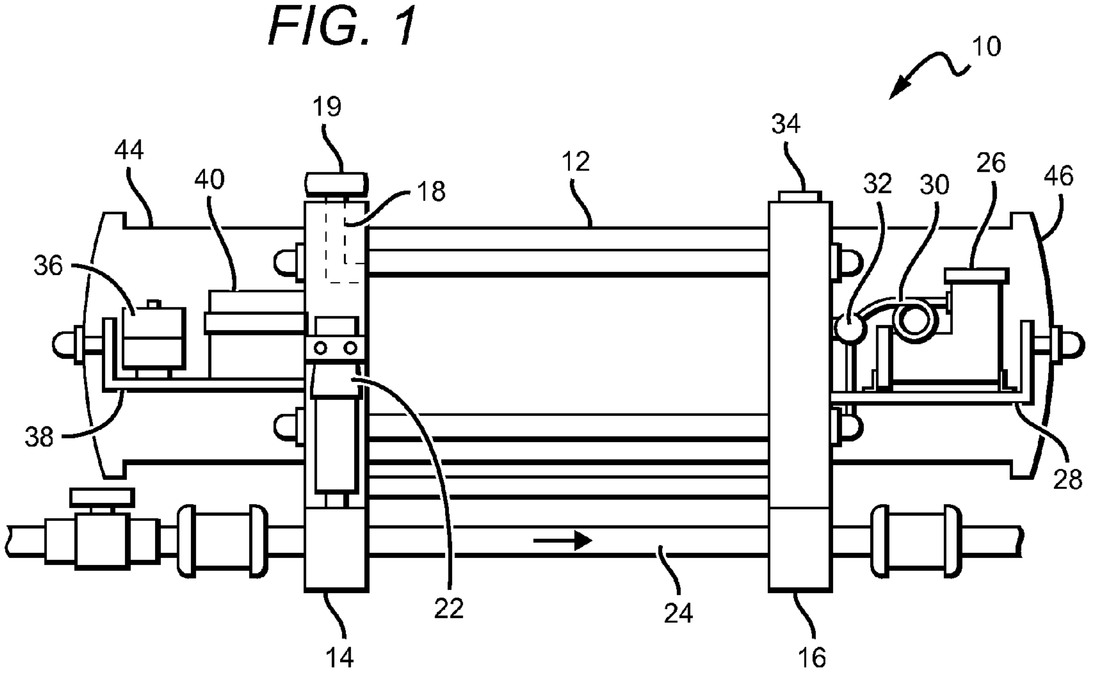
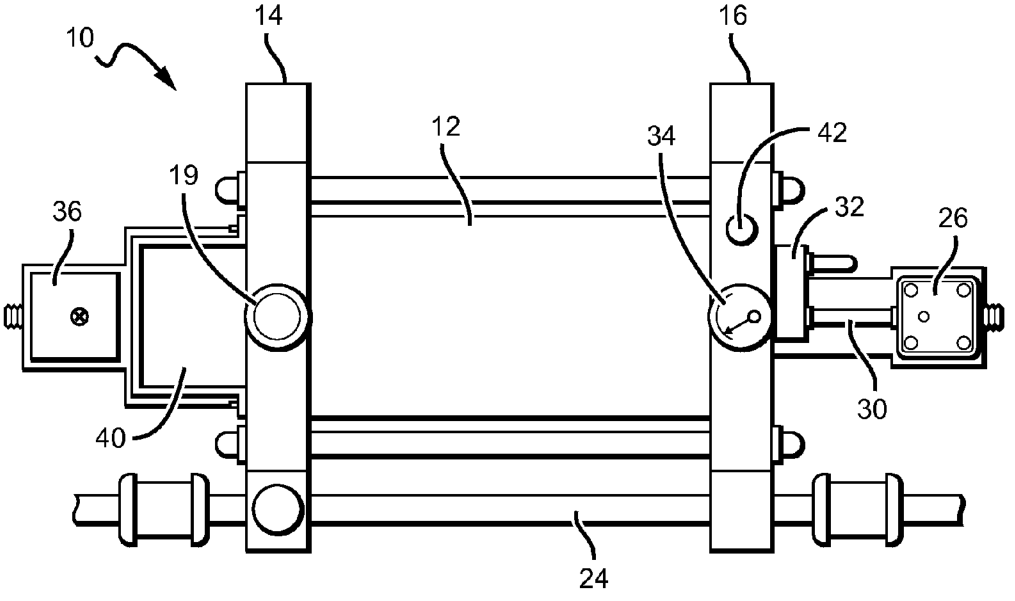
FIG. 2

ELECTROMECHANICAL APPARATUS SYSTEM AND METHODS FOR DISPENSING OR PURGING FLUIDS

BACKGROUND

1. Technical Field

This invention relates generally to fluid injection devices, methods and systems and is particularly directed to improved automatic fertilizer injection and water line purging devices, methods and systems for lawn maintenance.

2. State of the Art

Lawn fertilizing has always been a labor intensive operation that required the caregiver to fill a sprinkler or spreader with fertilizer and manually roll it across the lawn to deliver the fertilizer. For many years now, liquid fertilizers have been available and have been widely used by attaching a siphoning container to a hose and allowing the flow of the hose to siphon the fertilizer for delivery to the lawn. However, this approach still requires considerable time, resources and manual labor in order to attach the container to the hose and to direct the hose in watering and applying the fertilizer, and to detach the hose and store the component parts between uses.

Today many, if not most, lawns are therefore watered by automatic sprinkler or emitter systems. These eliminate the manual labor of watering the lawn and ensure that the lawn is watered at a convenient time. Most commercial and residential irrigation systems are "in ground" systems, which means that everything is buried in the ground. With the pipes, sprinklers, emitters (drippers), and irrigation valves being hidden, it makes for a cleaner, more presentable landscape without garden hoses or other items having to be moved around manually. This can, however, create some drawbacks in the maintenance of a completely buried system.

Most irrigation systems are divided into zones. A zone is a single irrigation valve having one or a group of drippers or sprinklers that are connected by pipes or tubes. Irrigation systems are divided into zones because there is usually not enough pressure and available flow to run sprinklers for an entire yard or sports field at once. Each zone typically has a solenoid valve that is controlled via wire by an irrigation controller. The irrigation controller is either a mechanical or electrical device such as a timer that typically signals a zone to turn on at a specific time and keeps it on for a specified amount of time. The irrigation controller therefore typically activates and deactivates the irrigation system on demand. Most irrigation controllers have means for setting the frequency of irrigation, the start time, and the duration of watering, for example. However, some controllers have additional features such as multiple programs to allow different watering frequencies for different types of plants, rain delay settings, input terminals for sensors such as rain and freeze sensors, soil moisture sensors, weather data, remote operation, and the like and keep it on for a specified amount of time.

When a zone comes on, the water flows through the lateral lines and ultimately ends up at the irrigation emitter (drip) or sprinkler heads. Many sprinklers have pipe thread inlets on the bottom of them which allows a fitting and the pipe to be attached to them. The sprinklers are usually installed with the top of the head flush with the ground surface. When the water is pressurized, the head will pop up out of the ground and water the desired area until the valve closes and shuts off that zone. Once there is no more water pressure in the lateral line, the sprinkler head will usually retract back into the ground. Emitters are generally laid on the soil surface or buried a few inches to reduce evaporation losses.

Fertigation is the application of fertilizers, soil amendments, or other water-soluble products through an irrigation system. Fertigation can provide plants with essential nutrients through the plant's leaves and roots. Furthermore, because most of the fertilizer gets absorbed directly into the plant, fertilizer run-off is virtually eliminated. Fertigation can also improve a plant's efficiency in holding water through an increase in root mass, thereby reducing total water needed. Fertigation means and methods can also potentially dispense more than just fertilizers, including repellants/controls as well as soil supplements and bio-stimulants in order to address other landscape concerns. Chemigation, a related and sometimes interchangeable term, is the application of chemicals through an irrigation system. Chemigation is considered to be a more restrictive and controlled process due to the potential nature of the products being delivered—typically pesticides, herbicides, fungicides—to cause harm to humans, animals, and the environment.

Fertigation can be achieved in a number of ways. Solid fertilizer pellets can be added to a mesh-like container positioned close to a single emitter, for example. Another approach is to manually place a mixing receptacle such as a bottle or jar in line, the receptacle typically having a cartridge containing concentrated liquid fertilizer that can be diluted in the tank and then injected into the irrigation system. Yet another approach is to use a container that can release small, precision doses of water soluble or liquid fertilizers into the water stream automatically. Problems with such approaches arise, for example, with the need to manually remove an in line fertilizer container from an automated irrigation system if a user wants to water without fertiziation, or the need to manually add fertilizer to the emitter-container type system.

Another major problem facing automatic watering systems, especially in cold climates, has been the need to purge the line to prevent freezing. In the past, this has been a very labor intensive operation and has frequently meant that, once purged, the automatic watering system would not be used again for several months until the freeze danger had passed.

Thus there remains a need for improved apparatuses, methods and systems that can inject liquids into and purge water lines, on demand, without interfering with usage of the system. And, in particular, there is a need for automated systems capable of injecting fertilizers into and purging sprinkler system within the lawn maintenance industry.

BRIEF DESCRIPTION OF THE DRAWINGS

Further objects, features and advantages of the invention will become apparent from the detailed description, below, when read in conjunction with the accompanying drawings in which:

FIG. 1 is an elevation view of one embodiment of a fluid injection and water line purging apparatus installed in an automatic lawn watering system;

FIG. 2 is a plan view of the apparatus shown in FIG. 1; and

DETAILED DESCRIPTION

Figure 3:
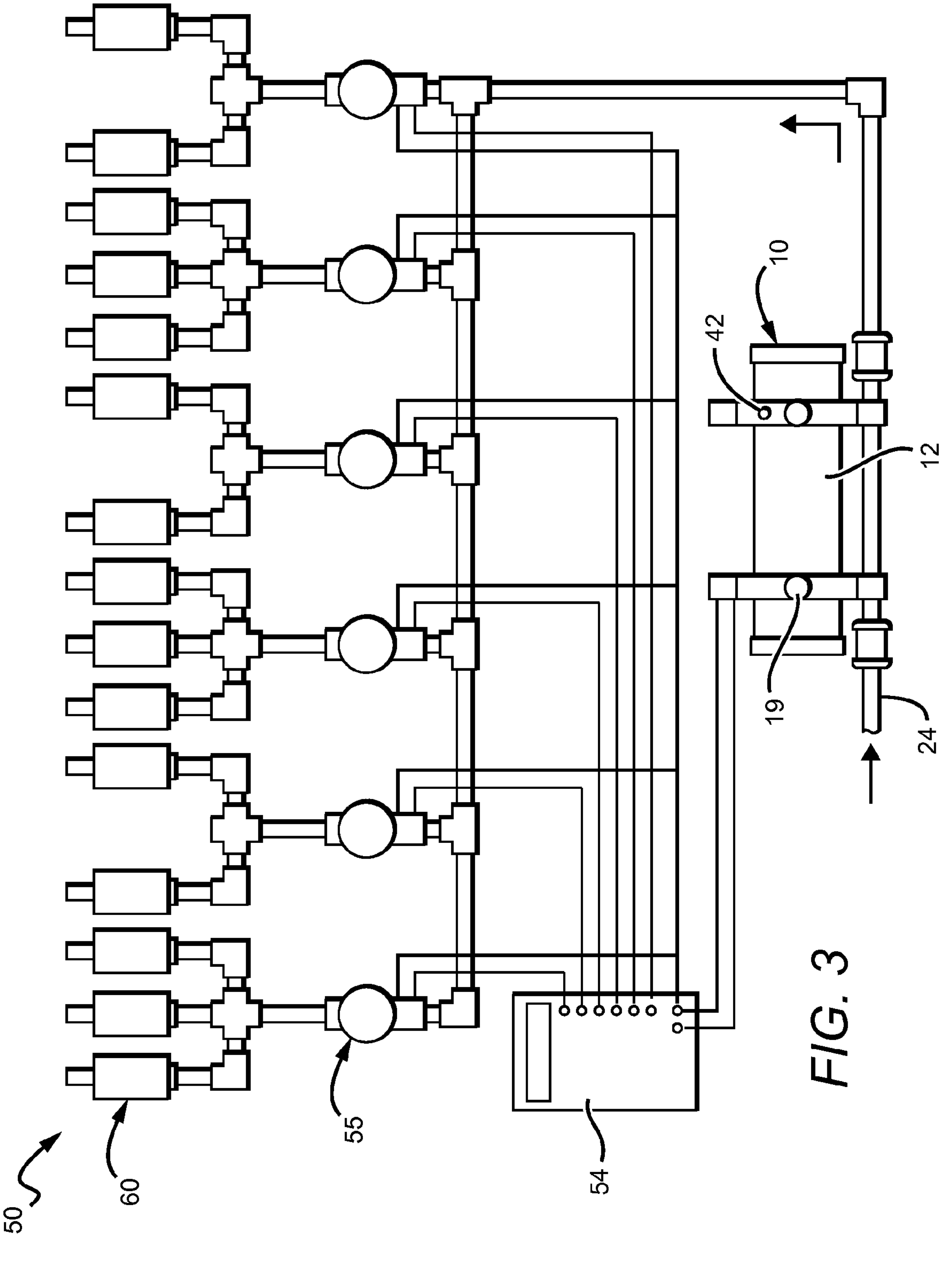
FIG. 3 is a diagrammatic representation of automatic irrigation system according to the invention showing the location of a fluid injection and water line purging apparatus ion with respect to a main water supply and a sprinkler system.

The following description is of a best mode presently contemplated for practicing the invention. This description is not to be taken in a limiting sense but is made merely for the purpose of describing the general principles of the invention whose scope may be ascertained by referring to the appended claims.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although a few suitable, exemplary processes and materials are described below, other processes and materials similar or equivalent to those described herein can also be used in the practice or testing of the invention. All publications, patent applications, patents, and other references mentioned herein are incorporated by reference in their entirety. In case of conflict, the present specification, including definitions, will control. In addition, the materials, processes, and examples are illustrative only and not intended to be limiting.

The following definitions refer to the particular embodiments described herein and are not to be taken as limiting; the invention includes equivalents for other undescribed embodiments.

As used herein, the term "controller" is intended to mean a mechanical or electrical device used to operate a machine, vehicle or system under certain conditions, including without limitation at a specific time or humidity. An irrigation controller, for example, is a device used to operate automatic irrigation systems such as lawn sprinklers and drip irrigation systems.

As used herein, the term "fluid" is intended to mean a substance that has no fixed shape and yields easily to external pressure; a gas or (especially) a liquid.

As used herein, the term "pressure switch" is intended to mean a form of switch that closes an electrical contact when a certain set pressure has been reached on its input means. The switch may be designed to make contact either on pressure rise or on pressure fall.

As used herein, the word "sprinkler head" is intended to mean a device attached to one or more outlets on a fluid distribution system which can emit the fluid in that system, including without limitation sprinklers or emitters used with fluids such as water, aqueous solutions and fire retardants.

As used herein, the term "sprinkler" is intended to mean a fluid distribution system having one or more outlets, including without limitation an irrigation system or fire retardant sprinkler.

As used herein, the term "tank" is intended to mean a large receptacle or storage chamber, especially one for liquids or gases.

The invention disclosed herein relates generally to a fluid injecting/dispensing and purging apparatuses, methods and systems and is particularly directed to improved automatic fertilizer injection and water line purging apparatuses, methods and systems for lawn maintenance, including without limitation innovations which can substantially inject liquids into and purge the pipes or sprinkler heads/emitters used in irrigations system. In the embodiments disclosed herein, an integrated apparatus can be used to inject fertilizer into, and purge, a water line on demand.

In one aspect of the invention, there is an apparatus/device for injecting fluids on demand. This apparatus can include as components:

a hollow tank for containing fluids;

a fill channel that provides means for the tank to be partially or completely filled with one or more fluids;

a fill cap for closing or sealing the fill channel when the tank is in use or in storage;

a check valve to prevent backflow;

an electric flow control valve for regulating the flow or pressure of a fluid moving within or out of the apparatus;

a compressor for supplying pressurized air to the interior of the tank;

a hose and an air manifold for moving pressurized air from the compressor to the tank;

a pressure gauge which can show the air pressure within the tank;

means to turn the compressor on and off as needed to maintain a desired level of air pressure within the tank;

an energy source to drive the compressor;

means to permit manual activation of the compressor; and optionally, one or more end covers may be provided to protect one or more of the components above from damage which could arise from a number of sources, including without limitation from exposure to the atmosphere or contact with external objects.

The apparatus can include end blocks which may provide support for the tank or apparatus. The end blocks may or may not be integrated with the tank. The tank may be filled manually or automatically, including without limitation using a fill controller and a fluid connection to an external supply of fluid. The liquid may be injected from more than one location on the tank, including without limitation through an opening on each of two end blocks, such that the fluid can exit the tank on both sides. Some or all of the components of the apparatus may be integrated.

In another aspect of the invention, there is a fluid injection system comprising an integrated apparatus according to the invention. The system can include a (main) intake structure capable of providing fluids, a distribution system having one or more output lines for distributing fluids to one or more locations, and an integrated apparatus according to the invention wherein all three components are fluidly connected to each other. The number of outlet lines can vary according to the application, including without limitation one outlet line for a fire hydrant or one or more lines for a sprinkler system. The fluid distribution system can be effective to provide any suitable fluids including without limitation water or air. In a further embodiment, the main intake structure is a water supply, the distribution system is an irrigation system, and the apparatus is positioned between the intake structure and the irrigation system.

In yet another aspect of the invention, there is a method for using the integrated apparatus for injecting fertilizer into or purging one or more output lines in a fluid distribution system. Fluids contained within the apparatus can be introduced into the main water line of a fluid distribution system using such methods.

In one embodiment, an apparatus according to the invention can be used to add fertilizer to or purge the distribution lines in an irrigation system. The steps of this method may include:

providing a main intake water supply fluidly coupled to a water distribution system having one or more distribution lines and a apparatus according to the invention where the apparatus is positioned between the intake structure and the irrigation system, and the distribution of water in the sprinkler system is controlled by valves in the distribution lines;

providing a controller in electrical contact with the apparatus;

adjusting the controller, thereby setting a desired first time to activate the apparatus and, optionally, a desired second time to subsequently deactivate the apparatus;

providing a quantity of liquid fertilizer to the tank component of the apparatus, and thereafter closing the tank;

adjusting the pressure switch, thereby setting a desired first pressure range having a first maximum pressure;

pressing a start-stop button to activate the apparatus;

waiting a period of time sufficient for the air pressure in the tank to reach the first maximum pressure, thereby deactivating the compressor;

waiting a period of time sufficient to active the apparatus, thereby opening an electrical control valve in the apparatus and allowing the air pressure in the tank to force the fertilizer into the one or more water distribution lines, optionally first through a flow control valve in the apparatus; and optionally, operating the apparatus for a period of time sufficient to exhaust the quantity of fertilizer in the tank, thereby allowing air flow through the flow control valve after the valves of the sprinkler system have been turned off, including without limitation when the sprinkler system is shut down or turned off either manually or automatically.

During the last, optional step of this method, the compressed air generated by the apparatus after the fertilizer is exhausted can serve to drive any water out of the lines of the automatic watering system in order to purge them. In winter or during other periods of cold weather, this can prevent undesired water from remaining in the lines, typically pipes, of the automatic watering system and thus prevent freezing of the water and rupture of the pipes. When the flow control valve shuts off, the pressure switch can sense that the air pressure in the tank is below the desired maximum value and can activate compressor in order to re-pressurize the tank. These same types of operations can be used to inject or purge any suitable fluid into any suitable distribution system, including without limitation injecting pesticides, herbicides, fire retardants or combinations thereof into a water distribution system such as an irrigation system.

In warm weather such as that which occurs during the summer, the quantity of fertilizer supplied to the tank may be sufficient for a plurality of fertilizer treatments. Alternatively, in cold weather such as that which occurs during the winter, only enough fertilizer for a single treatment may be supplied to the tank. In this way, the water lines can be purged each time the fertilizer is supplied. Alternatively, if it is desired to purge the water lines without fertilizing, no fertilizer may be supplied to the tank and the apparatus may be activated to purge the water lines without a fertilizing treatment.

Example 1

One embodiment of an apparatus according to the invention is illustrated in FIGS. 1-2. This embodiment is a fertilizer injection and water line purging apparatus 10 comprising a hollow tank 12 supported by end blocks 14 and 16 and having a fill channel 18, which permits the addition of fluids, including without limitation liquid fertilizer, into the tank 12 and a fill cap 19 to close or seal off the fill channel 18 when necessary, such as when the tank is in use or stored. Fluid from the tank 12 flows through an electric flow control valve 22 to be inserted into the main water line 24. A compressor 26 is mounted on a bracket 28 mounted on the end block 16 and supplies pressurized air through a hose 30 and air manifold 32 to the interior of the tank 12. A pressure gauge 34, mounted on an end block 16 shows the air pressure within the tank 12 and a pressure switch 36 mounted on a bracket 38 of the end block 16 serves to turn the compressor 26 on and off, as needed to maintain a desired level of air pressure within the tank. A battery 40 provides energy to drive the compressor 26. Finally, an on-off switch 42 serves to permit manual activation of the compressor 26. If desired, end covers 44 and 46 may be provided for aesthetics, support or to protect the components of the apparatus mounted on or beside brackets 28 and 38 from exposure to the atmosphere. The fertilizer injection and water line purging apparatus 10 illustrated in FIGS. 1-2 may be mounted above ground or in a suitable vault or other enclosure below ground, as desired for a particular application.

Example 2

Another embodiment according to the invention is an irrigation system as illustrated in FIG. 3. In this system 50, a fertilizer injection and water line purging apparatus 10 is connected into a main water line 24 at a point between its source and the valves 55 of an automatic sprinkler system 50. An automatic controller such as a timer 54 may be provided to control the fertilizer injection and water line purging apparatus 10 as well as the valves 55 of the sprinkler system in order to automatically regulate the delivery of water and fertilizer to the outlet lines 60 or sprinkler heads of the sprinkler system. As illustrated in FIG. 3, the controller 54 of the automatic watering system can be electrically connected to the fertilizer injection and water line purging apparatus 10. The fertilizer injection and water line purging apparatus 10 in the system may be mounted above ground or in a suitable vault or other enclosure below ground, as desired for a particular application.

Example 3

Figure 4:
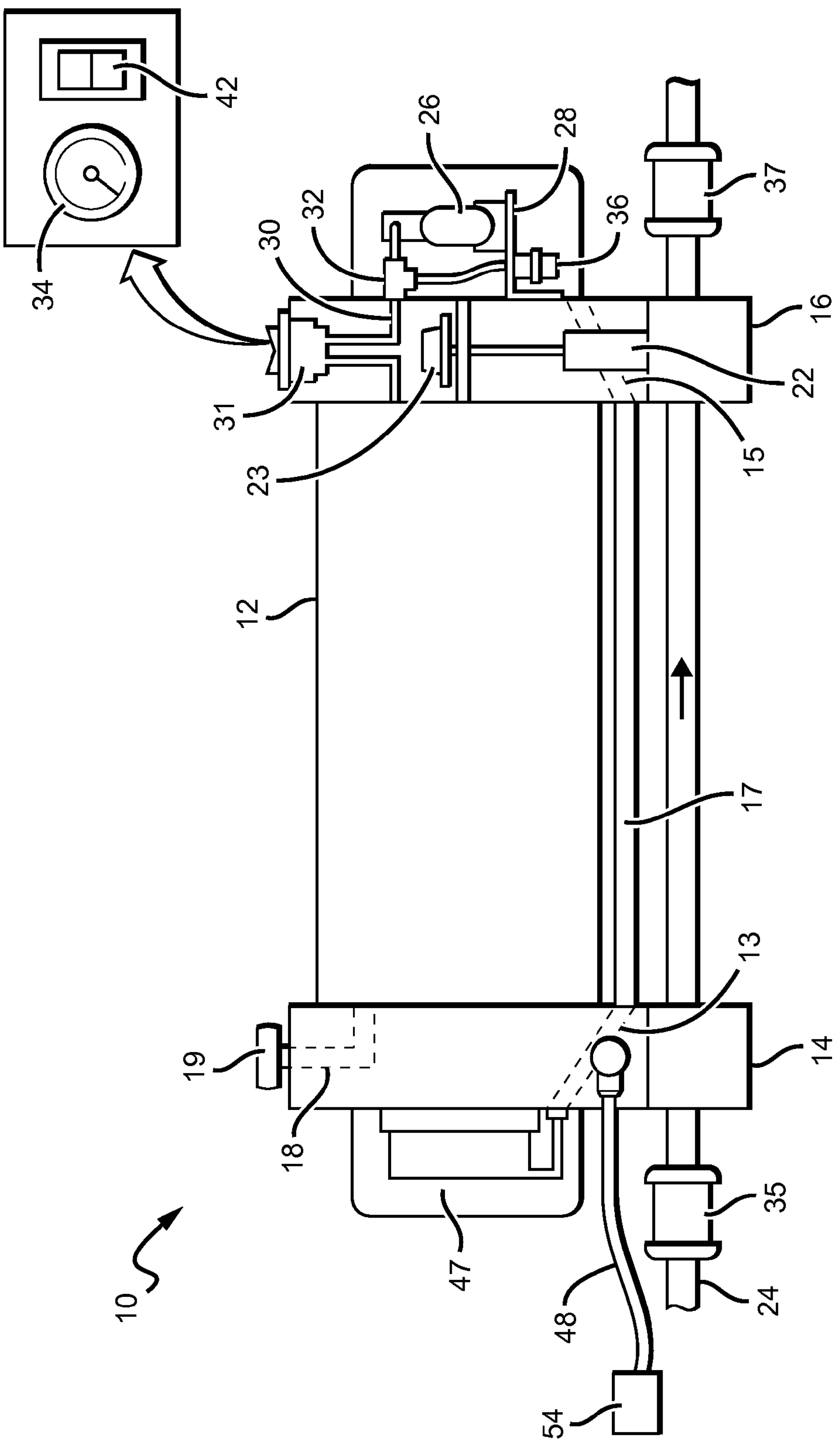
FIG. 4 is an elevation view of another embodiment of a fluid injection and water line purging apparatus installed in an automatic lawn watering system.

Yet another embodiment of an apparatus according to the invention is illustrated in FIG. 4. This embodiment is a fluid injection and water line purging apparatus 10 comprising a hollow tank 12 supported by end blocks 14 and 16, a fill channel 18 which permits the addition of fluids, including without limitation liquid fertilizer, into the tank 12 and a fill cap 19 to close or seal off the fill channel 18 when necessary, such as when the tank is in use or stored. Fluid from the tank 12 flows through an electric flow control valve 22 to be inserted into the main water line 24. The flow control valve 22 includes an adjustment dial 23 for adjusting the flow as needed for any particular application, including without limitation for use with liquids such as fertilizer or fire retardants. A compressor 26 mounted on a bracket 28 mounted on an end block 16 can supply pressurized air through a hose 30 and air manifold 32 to the interior of the tank 12. A pressure gauge 34, mounted on an end block 16 shows the air pressure within the tank 12 and a pressure switch 36 mounted on an end block 16 is effective to turn the compressor 26 on and off as needed to maintain a desired level of air pressure within the tank. An air chamber 31 provides means for the pressure switch to sample the air pressure in the tank 12. A conduit for electrical connections can be provided by angle drilled holes 13 and 15 in the end blocks 14 and 16 and a connecting portion of pipe 17 where the holes are connected by the pipe, including without limitation electrical connections between the relays 47, the compressor 26 and, optionally, through a connecting electrical cable 48, to an external controller such as a timer 54. Finally, an on-off switch 42 permits manual activation of the compressor 26. If desired, end covers and may be provided for aesthetics, support or to protect the items on bracket 28 from exposure to the atmosphere. The fluid injection and water line purging apparatus 10 illustrated in FIG. 4 may be mounted above ground or in a suitable vault or other enclosure below ground, as desired for a particular application. The apparatus can be connected to a main water or fluid line using connectors 35 and 36. This embodiment can be powered by an external power source electrically connected to the apparatus, such as through the connecting electrical cable 48 and/or using a battery 40 as shown for the embodiment illustrated in FIGS. 1-2.

Example 4

Another embodiment is a method of using a system according to the invention including, for example, a method of injecting fertilizer into or purging the irrigation system illustrated in FIG. 3. To arm the apparatus 10, fertilizer can be supplied to the tank 12 through a fill cap 19. The fertilizer may be liquid fertilizer or may be solid fertilizer which has been dissolved in a suitable solvent such as water. Once the fertilizer has been supplied to the tank 12, the user can set a desired pressure range (preset minimum and maximum pressure) on a pressure switch 36 and then press an apparatus controller, which in this embodiment is a manually controlled start-stop button 42, to activate the apparatus 10. Immediately, the pressure switch 36 can sense that the air pressure in the tank is below the preset minimum value of the pre-set pressure range and activates the compressor 26 which can supply pressurized air through a hose 30 and air manifold 32 to the tank 12. When the desired, pre-set maximum pressure is reached in the storage tank 12, the pressures switch 36 can shut off the compressor. When the apparatus controller 54 triggers the fertilizing-purging apparatus 10, an electric flow control valve 22 can be opened to allow the air pressure in the tank 12 to force the fertilizer through the flow control valve 22 and into the main water line 24, after which it can flow through valves 55 and sprinklers 60 of the automatic watering system.

When the fertilizer supply in the tank 12 has been exhausted, air can flow through the flow control valve 22 after the valves 55 of the sprinkler system have been turned off. Thus, the air can serve to drive any water out of the pipes of the automatic watering system to purge the lines. In winter or during other periods of cold weather, this can prevent undesired water from remaining in the lines of the automatic watering system and thus can prevent freezing of the water and rupture of the pipes. When the flow control valve 22 shuts off, the pressure switch 36 can sense that the air pressure in the tank 12 is below the desired maximum value and can activate compressor 26 to re-pressurize the tank 12. In warm weather such as that which occurs during the summer, the quantity of fertilizer supplied to tank 12 may be sufficient for a plurality of fertilizer treatments. Alternatively, in cold weather such as that which occurs during the winter, only enough fertilizer for a single treatment may be supplied to the tank 12. In this way, the water lines can be purged each time the fertilizer is supplied. Alternatively, if it is desired to purge the water lines without fertilizing, no fertilizer may be supplied to the tank 12 and the apparatus 10 may be activated to purge the water lines without a fertilizing treatment.

A fluid injection and water line purging apparatus according to the invention may be mounted above ground or in a suitable enclosure or container below ground during use or for storage, including without limitation a vault, as desired for any particular application.

Any suitable fluid, suspension or emulsion can be used with the invention, including without limitation a liquid fertilizer, a solid fertilizer dissolved in a suitable solvent or a suspension or emulsion comprising a solid fertilizer and a suitable solvent, and gases such as air or nitrogen. Solvents suitable for dissolving a solid or creating an emulsion or suspension according to the invention include without limitation water.

The storage tank can be made out of any suitable materials, including without limitation plastic or concrete. The tank can be supported by any suitable means, including without limitation using end blocks. The size and dimensions of the tank can vary according to a particular application. In some embodiments, the tank can have the capacity to hold sufficient fluid for a plurality of treatments.

Any suitable check valve or flow control valve can be used. In some embodiments, fluids within the apparatus can pass though a check or flow control valve, or both, before they are introduced into the main input line. In other embodiments, a check control valve can be positioned between the compressor and the tank. In either case, the check control valve can be effective to substantially of completely prevent backflow of fluids.

Any suitable pressure switch may be used and any suitable electrical connection between the pressure switch and the compressor or other electrical components of the apparatus.

Any suitable compressor can be used, and the compressor can be mounted on any suitable portion of the apparatus, including without limitation a bracket mounted on an end block. Similarly, any suitable type of hose or an air manifold can be used, and the hose or manifold can be mounted on any suitable portion of the apparatus, including without limitation on a bracket mounted on an end block.

Any suitable pressure gauge can be used, and it can be mounted on any suitable portion of the apparatus, including without limitation mounted on an end block.

Any means to turn the compressor on and off may be used, including without limitation a pressure switch, and such means can be mounted on any suitable portion of the apparatus including without limitation mounted on a bracket of an end block.

Any suitable energy source can be used to drive the compressor, including without limitation a battery and the energy source and be positioned at any suitable location on the apparatus, including without limitation on a bracket mounted on an end block.

Any suitable means to provide manual activation of the compressor can be used, including without limitation an on-off switch, and the switch can be positioned at any suitable location on the apparatus, including without limitation on an end block.

Any suitable fluid distribution system may be used with the invention, including without limitation a distribution system for water such as an irrigation system and a system for distributing chemicals such fire retardants.

While several illustrative embodiments of the invention have been disclosed herein, still further variations and alternative embodiments will occur to those skilled in the art.

Therefore, the fluid injection apparatus forming one aspect of the invention can be useful wherever the distribution of fluids, emulsions or suspensions to a large area is required and accordingly is amenable to a broad range of applications besides those described above, including without limitation for applying herbicidal, anti-erosion or flame retardant materials to areas of land. In some embodiments, the storage tank and one or both end blocks can be integrated to form a one-piece housing. In other embodiments, both end blocks can include a check valve, and an electric flow control valve electrically coupled to a controller and fluidly connected to the water line, thereby providing apparatuses, systems and methods in which the fluid in the storage tank can be emitted from both ends of the apparatus. Finally, the shape and dimensions of the systems, apparatuses and their components can vary depending upon the particular application, such as residential irrigation vs. irrigation for large scale commercial agriculture. Such variations and alternative embodiments are contemplated, and can be made without departing from the spirit and scope of the invention as defined in the appended claims.

I claim:

1. An apparatus for injecting fluid material into or purging a water line, the apparatus comprising:

a storage tank;

means for supplying a first fluid to the tank;

an air compressor for supplying pressurized air to the tank;

a pressure switch for monitoring the delivery of air from the compressor to the tank; and a flow control valve controlling delivery of fluid material from the tank to the water line.

2. The apparatus of claim 1, wherein the apparatus is mounted above or below ground level.

3. The apparatus of claim 1, wherein the pressure switch is at least one of: effective to activate the compressor when the air pressure in the tank falls below a first preset value, and effective to deactivate the compressor when the air pressure in the tank exceeds a second preset value.

4. The apparatus of claim 1, wherein the tank has a capacity to store sufficient fluid for a plurality of treatments.

5. The apparatus of claim 1, wherein the storage tank, the means for supplying a first fluid to the tank, the air compressor, the pressure switch and the flow control valve are integrated into a single unit.

6. The apparatus of claim 1, further comprising one or more end blocks wherein the end blocks are effective to support the tank.

7. The apparatus of claim 1, wherein the fluid in the tank is delivered to the water line from more than one location in the tank.

8. The apparatus of claim 1, further comprising a first controller electrically connected to the pressure switch, wherein the controller is effective to activate or deactivate the pressure switch.

9. The apparatus of claim 8, wherein the first controller is an on-off switch.

10. The apparatus of claim 1 further comprising a check valve connected between the tank and the flow control valve to permit fluid to flow only out of the tank.

11. The apparatus of claim 1, wherein the pressure switch is adjustable.

12. A fluid injection system comprising the apparatus of claim 1 and a water distribution system comprising a water source, a main water line, one or more distribution outlets and a second controller, wherein the water line is fluidly connected to the source and the one or more outlets, the apparatus is connected to the water line between the source and the one or more outlets, and the second controller is electrically connected to the flow control valve in the apparatus.

13. The system of claim 12, wherein the flow control valve permits the compressor to deliver compressed air to the water line after the distribution system has ceased delivering fluid, thereby providing means to substantially purge water or fluid from the distribution system.

14. The system of claim 12, wherein the second controller allows the flow control valve to remain open after the water distribution system has been shut down.

15. The system of claim 12, wherein the water distribution system comprises a plurality of outlet pipes, wherein:

each pipe is effective to deliver water to a respective sprinkler head; and compressed air provided by the apparatus is effective to substantially purge water from the pipes or the sprinkler heads.

16. The system of claim 12, wherein the system is effective to deliver at least one fluid through the one or more outlets, wherein the fluid is chosen from the group consisting of a fertilizer, a pesticide, an herbicide and a gas.

17. A fertilizer injection and water line purging system comprising the apparatus of claim 1.

18. A method for injecting fluid material into a water line using the system of claim 12, the method comprising:

providing a water line having a fluid connection to the source and the at least one outlet, a first controller electrically connected to the pressure switch and a second controller electrically connected to the water distribution system;

providing a volume of substantially fluid material to the storage tank;

closing or sealing the tank;

activating the apparatus using the first controller;

operating the apparatus for a first time period sufficient to pressurize the air in the storage tank to a value within an internal pressure range effective to deliver at least one portion of the fluid material to the water line, wherein the range comprises a first minimum pressure and a second maximum pressure;

opening the flow control valve using the second controller; and operating the system for a second time period sufficient to inject at least one portion of the fluid material into the water line.

19. The method of claim 18, wherein the second controller is a timer.

20. The method of claim 18, wherein:

the at least one outlet is fluidly connected to at least one sprinkler head;

the fluid material comprises at least one of a fertilizer, pesticide, and a herbicide; and the method is effective to provide the fluid material to the at least one sprinkler head.

21. The method of claim 18, further comprising operating the system sequentially for a third time period wherein the storage tank is empty, thereby purging the water line between the apparatus and the at least one outlet.

22. The method of claim 18, further comprising adjusting the pressure switch to select the internal pressure range.

23. A method for purging a water line using the system of claim 12, the method comprising:

providing a water line having a fluid connection to the source and at least one outlet;

providing an apparatus having an empty storage tank;

closing or sealing the tank;

selecting an internal pressure range effective to purge the water line;

activating the pressure switch using the first controller; and operating the system for a time period sufficient to purge the water line between the apparatus and the at least one outlet.

24. The method of claim 23, wherein the at least one outlet is fluidly connected to a sprinkler system, and the method is effective to substantially purge the system.

* * * * *